United States Patent
Mabuchi

(10) Patent No.: US 9,674,472 B2
(45) Date of Patent: Jun. 6, 2017

(54) SOLID-STATE IMAGING DEVICE, DRIVING METHOD THEREOF, AND IMAGING APPARATUS

(71) Applicant: SONY CORPORATION, Tokyo (JP)

(72) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 32 days.

(21) Appl. No.: 14/765,203

(22) PCT Filed: Feb. 3, 2014

(86) PCT No.: PCT/JP2014/000555
§ 371 (c)(1),
(2) Date: Jul. 31, 2015

(87) PCT Pub. No.: WO2014/125785
PCT Pub. Date: Aug. 21, 2014

(65) Prior Publication Data
US 2015/0381915 A1   Dec. 31, 2015

(30) Foreign Application Priority Data
Feb. 13, 2013 (JP) ................................. 2013-025831

(51) Int. Cl.
*H04N 5/335* (2011.01)
*H03M 1/12* (2006.01)
(Continued)

(52) U.S. Cl.
CPC ............. *H04N 5/376* (2013.01); *H04N 5/341* (2013.01); *H04N 5/378* (2013.01)

(58) Field of Classification Search
CPC ............. H01L 27/14618; H01L 27/148; H01L 29/762; H04N 5/2257; H04N 2201/02429; H04N 5/372
(Continued)

(56) References Cited

U.S. PATENT DOCUMENTS

2003/0025820 A1 * 2/2003 Miyahara ............ H04N 3/1575
348/323
2003/0130562 A1   7/2003 Barbato et al.
(Continued)

FOREIGN PATENT DOCUMENTS

JP   H06-259048   9/1994
JP   2000-184282   6/2000
(Continued)

OTHER PUBLICATIONS

International Search Report prepared by the European Patent Office on Apr. 11, 2014, for International Application No. PCT/JP2014/000555.
(Continued)

*Primary Examiner* — Xi Wang
(74) *Attorney, Agent, or Firm* — Sheridan Ross P.C.

(57) ABSTRACT

A solid-state imaging device comprises a plurality of pixel blocks arranged in a matrix, each of the pixel blocks including a plurality of pixels that generate a charge in response to input light; a control unit including a vertical scanning unit and a horizontal scanning unit; and a plurality of analog-to-digital converters, each of the analog-to-digital converters disposed corresponding to pixel blocks. The control unit is configured to sequentially scan the pixels at a timing so that adjacent pixels which are located on a boundary of adjacent pixel blocks are scanned simultaneously.

14 Claims, 7 Drawing Sheets

(51) Int. Cl.
*H01L 27/00* (2006.01)
*H01L 31/113* (2006.01)
*H04N 5/376* (2011.01)
*H04N 5/341* (2011.01)
*H04N 5/378* (2011.01)

(58) Field of Classification Search
USPC ............ 348/311, 282, 308, 223.1, 572, 294; 358/483; 257/222, 225, 292, 291, 294, 257/440, 443–448; 250/208.1
See application file for complete search history.

(56) References Cited

U.S. PATENT DOCUMENTS

| | | | |
|---|---|---|---|
| 2004/0080637 A1* | 4/2004 | Nakamura | H04N 5/243 348/255 |
| 2005/0116251 A1* | 6/2005 | Abe | H01L 27/14603 257/146 |
| 2006/0013485 A1 | 1/2006 | Nitta et al. | |
| 2006/0103745 A1 | 5/2006 | Nagaishi et al. | |
| 2008/0303930 A1* | 12/2008 | Kuroda | H01L 27/14603 348/308 |
| 2009/0091806 A1 | 4/2009 | Inuiya | |
| 2009/0242950 A1* | 10/2009 | McCarten | H01L 27/14634 257/292 |
| 2009/0244332 A1 | 10/2009 | Sonoda | |
| 2010/0157091 A1* | 6/2010 | Honda | H01L 27/14645 348/223.1 |
| 2012/0120293 A1 | 5/2012 | Mabuchi | |

FOREIGN PATENT DOCUMENTS

| | | |
|---|---|---|
| JP | 2003 032556 A | 1/2003 |
| JP | 2005-020039 | 1/2005 |
| JP | 2009-177207 | 8/2009 |

OTHER PUBLICATIONS

Written Opinion of the International Searching Authority prepared by the European Patent Office on Apr. 11, 2014, for International Application No. PCT/JP2014/000555.

Official Action (no English translation available) for Japanese Patent Application No. 2013-025831 mailed Feb. 16, 2016, 4 pages.

* cited by examiner

SOLID-STATE IMAGING DEVICE, DRIVING METHOD THEREOF, AND IMAGING APPARATUS

CROSS REFERENCE TO RELATED APPLICATIONS

This application is a national stage application under 35 U.S.C, 371 and claims the benefit of PCT Application No. PCT/JP2014/000555 having an international filing date of Feb. 3, 2014 which designated the United States which PCT Application claimed the benefit of Japanese Priority Patent Application JP 2013-025831 filed Feb. 13, 2013, the entire contents of which are incorporated herein by reference.

TECHNICAL FIELD

The present disclosure relates to a solid-state imaging element, a driving method thereof, and an imaging apparatus, and in particular, to a solid-state imaging element which is preferable when providing an Analog-Digital (AD) conversion unit in each pixel block configured by a plurality of pixels, a driving method thereof, and an imaging apparatus.

BACKGROUND ART

As a solid-state imaging device which is mounted on a digital still camera, or a digital video camera, a CMOS image sensor (hereinafter, abbreviated to CIS) has been known. In addition, there is a case in which the CIS is used in an imaging apparatus for sensing, and in a case of such a use, rapidity of operations is particularly necessary.

For acceleration of operations of the CIS, a method in which an AD conversion unit (hereinafter, abbreviated to ADC) is provided to one, or a relatively small number of pixels, and a plurality of the ADCs are operated in parallel has been known.

In such a method, optical characteristics of pixels are sacrificed when providing the ADC in the same substrate of the pixel.

Therefore, a configuration in which pixels and ADCs are provided on separate substrates, and both of the substrates are connected by being bonded using Cu—Cu bonding in order not to sacrifice optical characteristics of the pixels has been proposed. In addition, since a size of one ADC usually corresponds to a size of a plurality of pixels, the plurality of pixels on the separate substrate are correspondingly connected to the one ADC (for example, refer to PTL 1).

FIG. 1 illustrates a conceptual diagram when a pixel block which is configured by 16 pixels of 4*4 pixels in total is correspondingly connected to one ADC on a separate substrate. In the figure, a rectangle of a thin line denotes a pixel, a thick line denotes a pixel block which is correlated with one ADC, numbers denote positions of pixels, and arrows denote scanning order of pixels. In addition, a pixel which is located on an X row and a Y column is described as a pixel (X, Y).

For example, in a pixel block of which a pixel (0,0) is on the upper left top, scanning is started in the right horizontal direction by setting a pixel on the lower left (3,0) as a starting point, and a row to be scanned is moved in the upper vertical direction sequentially, and an upper right pixel (0,3) is lastly read out. Similarly, in a right neighbor pixel block of the pixel block, scanning is started in the right horizontal direction by setting a pixel on the lower left (3,4) as a starting point, and a row to be scanned is moved in the upper vertical direction sequentially, and an upper right pixel (0,7) is lastly read out.

That is, in each pixel block, a pixel on the lower left is set to a starting point, scanning is started in the right horizontal direction, a row to be scanned is moved in the upper vertical direction sequentially, and a pixel on the upper right is lastly read out.

CITATION LIST

Patent Literature

PTL 1: Japanese Unexamined Patent Application Publication No. 2009-177207

SUMMARY OF INVENTION

Technical Problem

In a case of a scanning order which is illustrated in FIG. 1, scanning timings (timings of being read out) of pixels on a boundary between neighboring pixel blocks, for example, a pixel (0, 3) and a pixel (0,4), a pixel (3,3) and a pixel (3,4), a pixel (3,0) and a pixel (4,0), and the like, do not match with each other. In addition, in a case of a pixel block of 4*4 pixels, deviation in scanning timing is merely by 16 pixels at the most, however, a correction becomes difficult when accumulating time of pixels is short, or when there is a motion of an object. Accordingly, blurring occurs in an image on a boundary between pixel blocks, and when the CIS is used for image sensing, or the like, a recognition rate in recognition of a moving body is lowered.

The present disclosure has been made in consideration of such a situation, and has been made so that blurring does not occur in an image on a boundary between pixel blocks, when one ADC is correlated with a pixel block which is configured by a plurality of pixels, in a CIS.

Solution to Problem

One exemplary aspect of the present disclosure is a solid-state imaging device comprising: a plurality of pixel blocks arranged in a matrix, respective ones of the pixel blocks including a plurality of pixels configured to generate a charge corresponding to input light; a control unit including a vertical scanning unit and a horizontal scanning unit; and a plurality of analog-to-digital converters, respective ones of the analog-to-digital converters disposed corresponding to respective ones of the pixel blocks, wherein the control unit is configured to sequentially scan respective ones of the pixels at a timing such that adjacent pixels which are located on a boundary of adjacent pixel blocks are scanned simultaneously.

Another exemplary aspect of the present disclosure is a method of driving a solid-state imaging device comprising a plurality of pixel blocks arranged in a matrix, respective ones of the pixel blocks including a plurality of pixels configured to generate a charge corresponding to input light; a control unit including a vertical scanning unit and a horizontal scanning unit; and a plurality of analog-to-digital converters, respective ones of the analog-to-digital converters disposed corresponding to respective ones of the pixel blocks, the method comprising the step of: sequentially scanning respective ones of the pixels at a timing such that adjacent pixels which are located on a boundary of adjacent pixel blocks are scanned simultaneously.

Advantageous Effects of Invention

According to the embodiments, it is possible to suppress occurring of blurring of an image on a boundary between pixel blocks.

DESCRIPTION OF EMBODIMENTS

Hereinafter, best forms for executing the present disclosure (hereinafter, referred to as embodiments) will be described in detail with reference to drawings.

Embodiment

Figure 1:
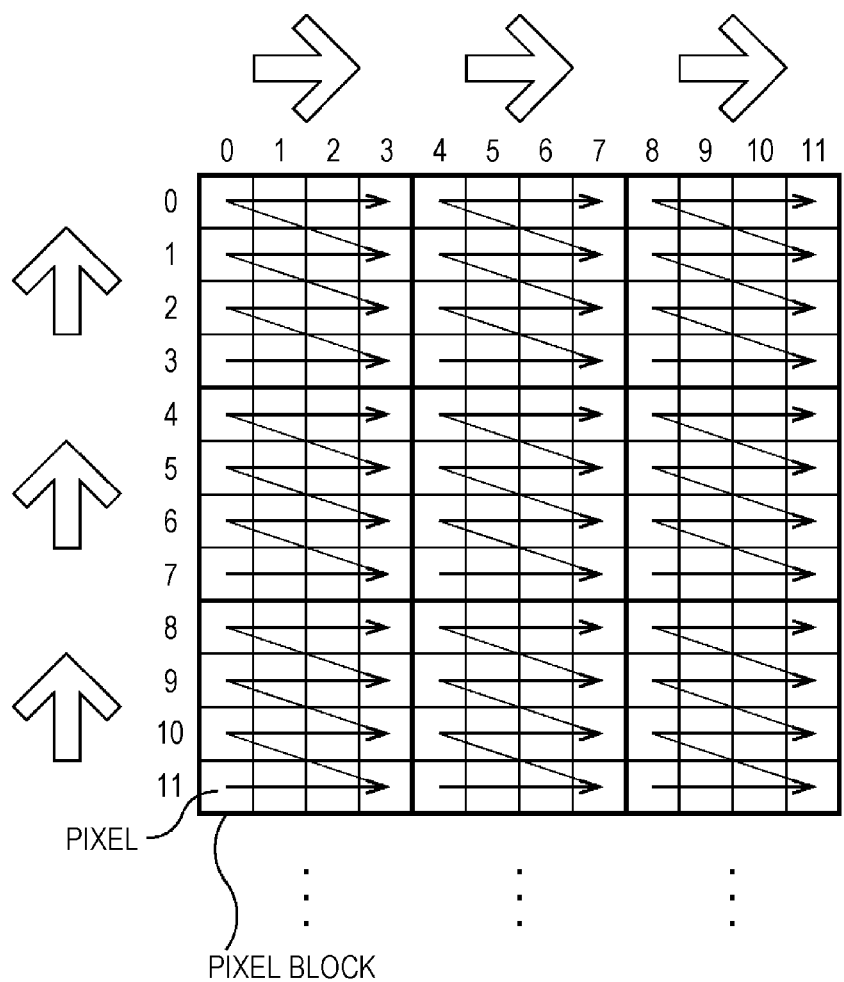
FIG. 1 is a diagram which illustrates scanning order of a pixel in a pixel block in the related art.
Figure 2:
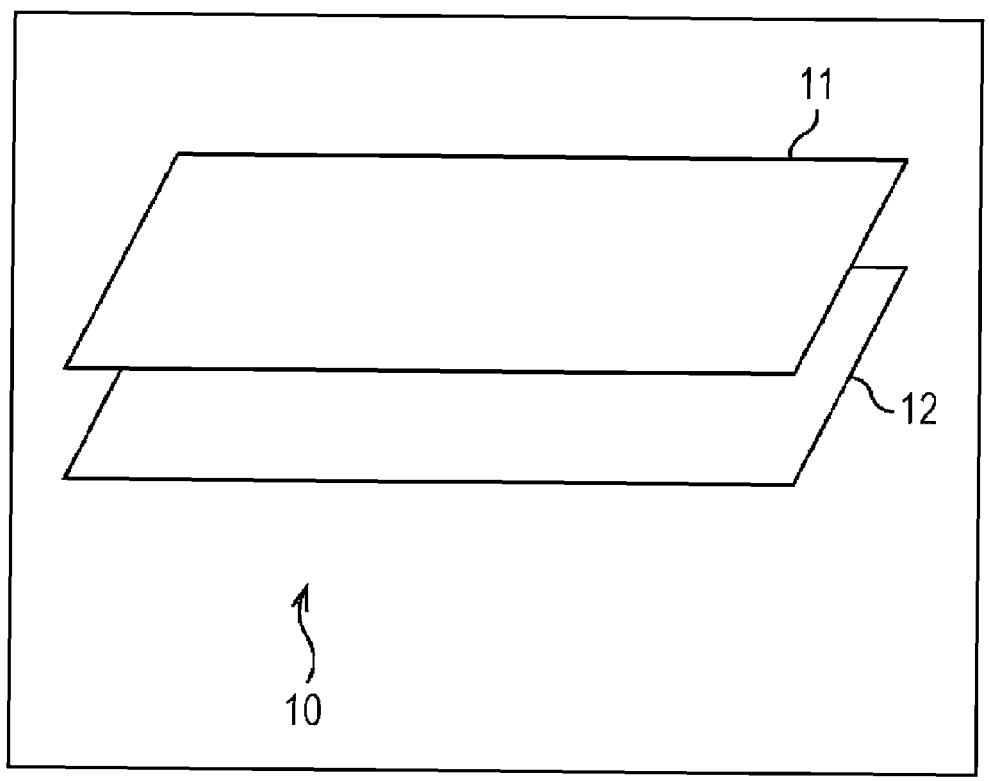
FIG. 2 is a diagram which illustrates a configuration example of a substrate of a solid-state imaging device to which the present disclosure is applied.

Configuration Example of Solid-State Imaging Device as an Embodiment of the Present Disclosure FIG. 2 is a conceptual diagram which illustrates that a solid-state imaging device as embodiments of the present disclosure is configured by two substrates. That is, the solid-state imaging device 10 is configured by an upper substrate 11 and a lower substrate 12, and the upper substrate 11 and lower substrate 12 are bonded using Cu—Cu bonding, or the like, and are connected to each other at corresponding portions.

Figure 3A:
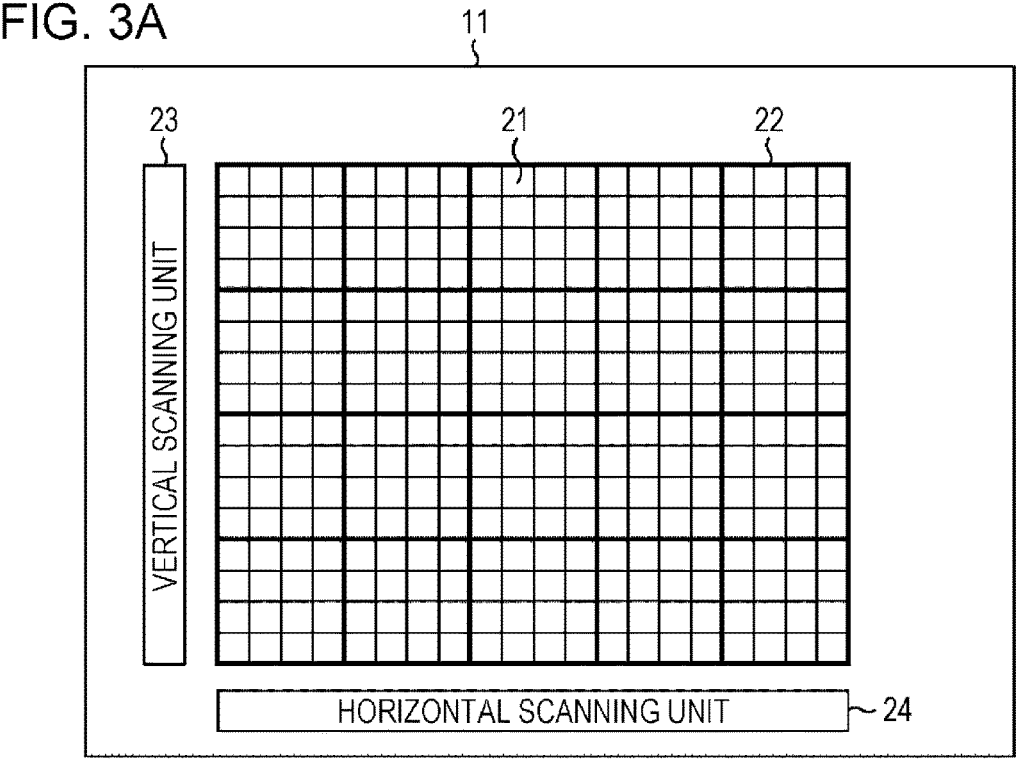
FIG. 3A is a block diagram which illustrates configuration example of an upper substrate in FIG. 2.
Figure 3B:
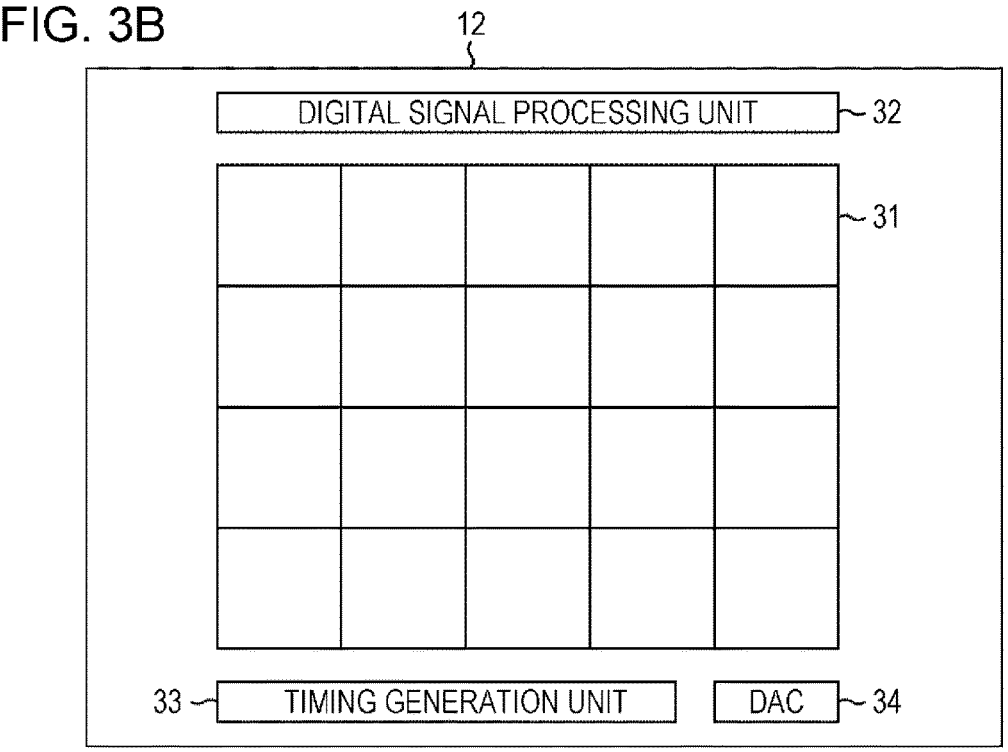
FIG. 3B is a block diagram which illustrates configuration example of a lower substrate in FIG. 2.

FIGS. 3A and 3B schematically illustrate the upper substrate 11 and the lower substrate 12, and respective circuit configurations thereof.

As illustrated in FIG. 3A, the upper substrate 11 is provided with a plurality of pixels 21 which are arranged in a matrix, a vertical scanning unit 23, and a horizontal scanning unit 24. Each of the plurality of pixels 21 is divided into one pixel block 22 by 4*4 pixels. The pixel 21 generates a charge corresponding to input light using photoelectric conversion processing, accumulates the charge, and transmits a pixel signal corresponding to the accumulated charge to an ADC 31 of the lower substrate 12 at a scanning timing based on a control from the vertical scanning unit 23 and the horizontal scanning unit 24.

In addition, according to the embodiment, the pixel block 22 is configured by 16 pixels of 4*4 pixels in total, however, the number of pixels 21, or a shape thereof which configures the pixel block 22 is arbitrary, and is not limited to 4*4 pixels.

As illustrated in FIG. 3B, the lower substrate 12 is provided with a plurality of ADCs 31 which respectively correspond to the pixel block 22 of the upper substrate 11, a digital signal processing unit 32, a timing generation unit 33, and a DAC 34. Each ADC 31 converts analog pixel signals which are sequentially transmitted from the plurality of pixels 21 which belong to corresponding pixel block 22 into a digital signal.

Figure 4:
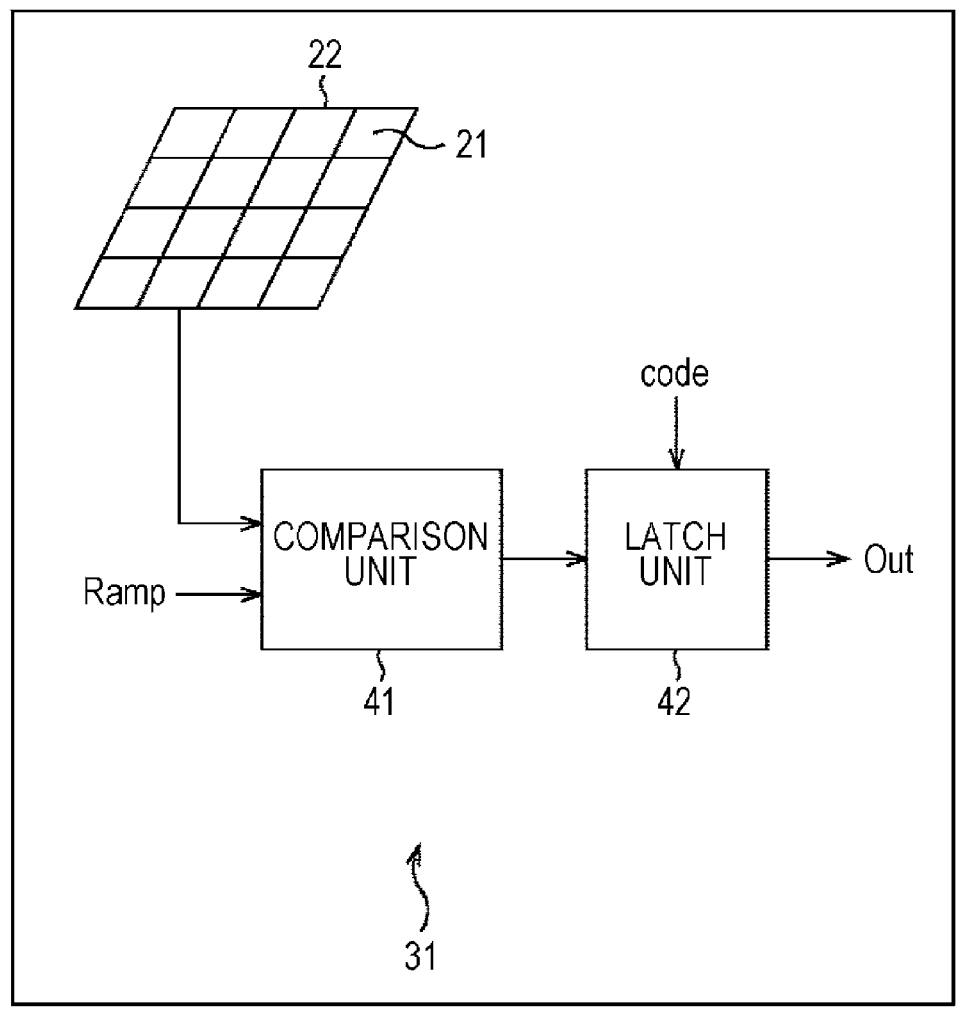
FIG. 4 is a block diagram which illustrates a configuration example of an ADC.

FIG. 4 illustrates a configuration example of the ADC 31. The ADC 31 includes a comparison unit 41 and a latch unit 42. The comparison unit 41 compares analog pixel signals which are sequentially transmitted from each pixel 21 of a corresponding pixel block 22 with a Ramp signal which is input from the DAC 34, and outputs a comparison result thereof to the latch unit 42. The latch unit 42 maintains an input code value when a Ramp signal crosses the pixel signal based on the comparison result of the comparison unit 41. The code value which is maintained in the latch unit 42 is read out in the digital signal processing unit 32 as a digital pixel signal.

<Descriptions of Operation>

Figure 5:
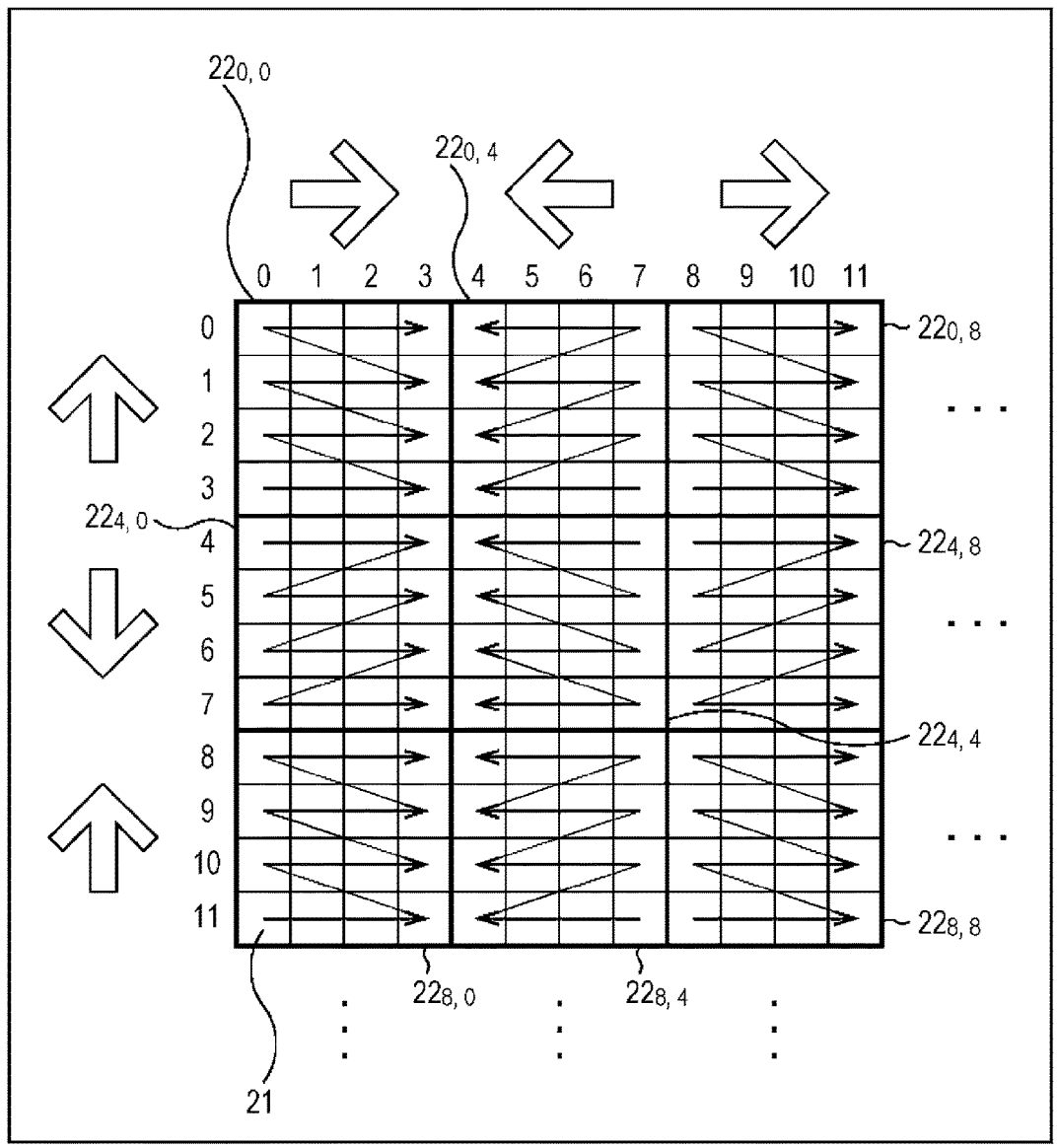
FIG. 5 is a diagram which illustrates scanning order of pixels in pixel blocks according to the present disclosure.

FIG. 5 illustrates an example of scanning order of the plurality of pixels 21 in each pixel block 22 which is provided on the upper substrate 11 of the solid-state imaging device 10. In the figure, a rectangle of a thin line denotes a pixel 21, a thick line denotes a pixel block 22 which is correlated with one ADC 31, numbers denote positions of pixels, and arrows denote scanning order of pixels. In addition, a pixel 21 of an X row and a Y column is described as a pixel (X, Y).

For example, in a pixel block $22_{0,0}$ in which a pixel (0,0) is located on the upper left top, scanning is started in the right horizontal direction by setting a lower left pixel (3,0) as a starting point, a row to be scanned is moved in the upper vertical direction sequentially, and a pixel on the upper right (0,3) is lastly scanned.

In a pixel block $22_{0,4}$ in which a pixel (0,4) is located on the upper left top, scanning is started in the left horizontal direction by setting a lower right pixel (3,7) as a starting point, a row to be scanned is moved in the upper vertical direction sequentially, and a pixel on the upper left (0,4) is lastly scanned.

In a pixel block $22_{0,8}$ in which a pixel (0,8) is located on the upper left top, scanning is started in the right horizontal direction by setting a lower left pixel (3,8) as a starting point, a row to be scanned is moved in the upper vertical direction sequentially, and a pixel on the upper right (0,11) is lastly scanned.

In a pixel block $22_{4,0}$ in which a pixel (4,0) is located on the upper left top, scanning is started in the right horizontal direction by setting the upper left pixel (4,0) as a starting point, a row to be scanned is moved in the upper vertical direction sequentially, and a pixel on the lower right (7,3) is lastly scanned.

In a pixel block $22_{4,4}$ in which a pixel (4,4) is located on the upper left top, scanning is started in the left horizontal direction by setting the upper right pixel (4,7) as a starting point, a row to be scanned is moved in the lower vertical direction sequentially, and a pixel on the lower left (7,4) is lastly scanned.

In a pixel block $22_{4,8}$ in which a pixel (4,8) is located on the upper left top, scanning is started in the right horizontal direction by setting the upper left pixel (4,8) as a starting point, a row to be scanned is moved in the lower vertical direction sequentially, and a pixel on the lower right (7,11) is lastly scanned.

In a pixel block $22_{8,0}$ in which a pixel (8,0) is located on the upper left top, scanning is started in the right horizontal direction by setting the lower left pixel (11,0) as a starting point, a row to be scanned is moved in the upper vertical direction sequentially, and a pixel on the upper right (8,3) is lastly scanned.

In a pixel block $22_{8,4}$ in which a pixel (8,4) is located on the upper left top, scanning is started in the left horizontal direction by setting the lower right pixel (11,7) as a starting point, a row to be scanned is moved in the upper vertical direction sequentially, and a pixel on the upper left (8,4) is lastly scanned.

In a pixel block $22_{8,8}$ in which a pixel (8,8) is located on the upper left top, scanning is started in the right horizontal direction by setting the lower left pixel (11,8) as a starting point, a row to be scanned is moved in the upper vertical direction sequentially, and a pixel on the upper right (8,11) is lastly scanned.

That is, there are four patterns of scanning order of the 16 pixels which belong to the pixel block 22, and when paying attention to a pixel block $22_{X, Y}$, pixel blocks 22 of which scanning order is common to that of the pixel block $22_{X, Y}$ are a pixel block $22_{X, Y+8}$ which is separated by one pixel block in the right direction, a pixel block $22_{X, Y-8}$ which is separated by one pixel block in the left direction, a pixel block $22_{X-8, Y}$ which is separated by one pixel block in the upper direction, and a pixel block $22_{X+8, Y}$ which is separated by one pixel block in the lower direction.

In addition, scanning order of a pixel block $22_{X, Y+4}$, and a pixel block $22_{X, Y-4}$ which are close to the pixel block $22_{X, Y}$ on the left and right with respect to the scanning order of the pixel block $22_{X, Y}$ is opposite in a movement in the horizontal direction, and is common in a movement in the vertical direction.

In addition, scanning order of a pixel block $22_{X-4, Y}$, and a pixel block $22_{X+4, Y}$ which are vertically close to the pixel block $22_{X, Y}$ with respect to the scanning order of the pixel block $22_{X, Y}$ is opposite in a movement in the vertical direction, and is common in a movement in the horizontal direction.

In addition, scanning order of a pixel block $22_{X-4, Y-4}$, a pixel block $22_{X+4, Y+4}$, a pixel block $22_{X+4, Y-4}$, and a pixel block $22_{X+4, Y+4}$, which are located diagonally to the pixel block $22_{X, Y}$ with respect to the scanning order of the pixel block $22_{X, Y}$ is opposite in a movement in the horizontal direction, and is also opposite in a movement in the vertical direction.

Scanning timings of pixels which are located on a boundary of neighboring pixel blocks 22 typically match with each other when setting scanning order of the 16 pixels which belong to each pixel block 22 as illustrated in the figure. Accordingly, it is possible to prevent blurring in an image from occurring on a boundary of pixel blocks 22, and to suppress a change in topology of an object in an image.

In this case, when there is a motion in an object, a direction of a distortion of an image in each pixel block 22 becomes different, however, in a case of a use for sensing, in many cases, the change in topology influences recognizing of a moving body rather than the difference in the direction of the distortion in each pixel block. Accordingly, the solid-state imaging device 10 according to the embodiment is preferable for a use of sensing in particular, and can suppress lowering of a recognition rate when recognizing a moving body.

Modification Example

Figure 6:
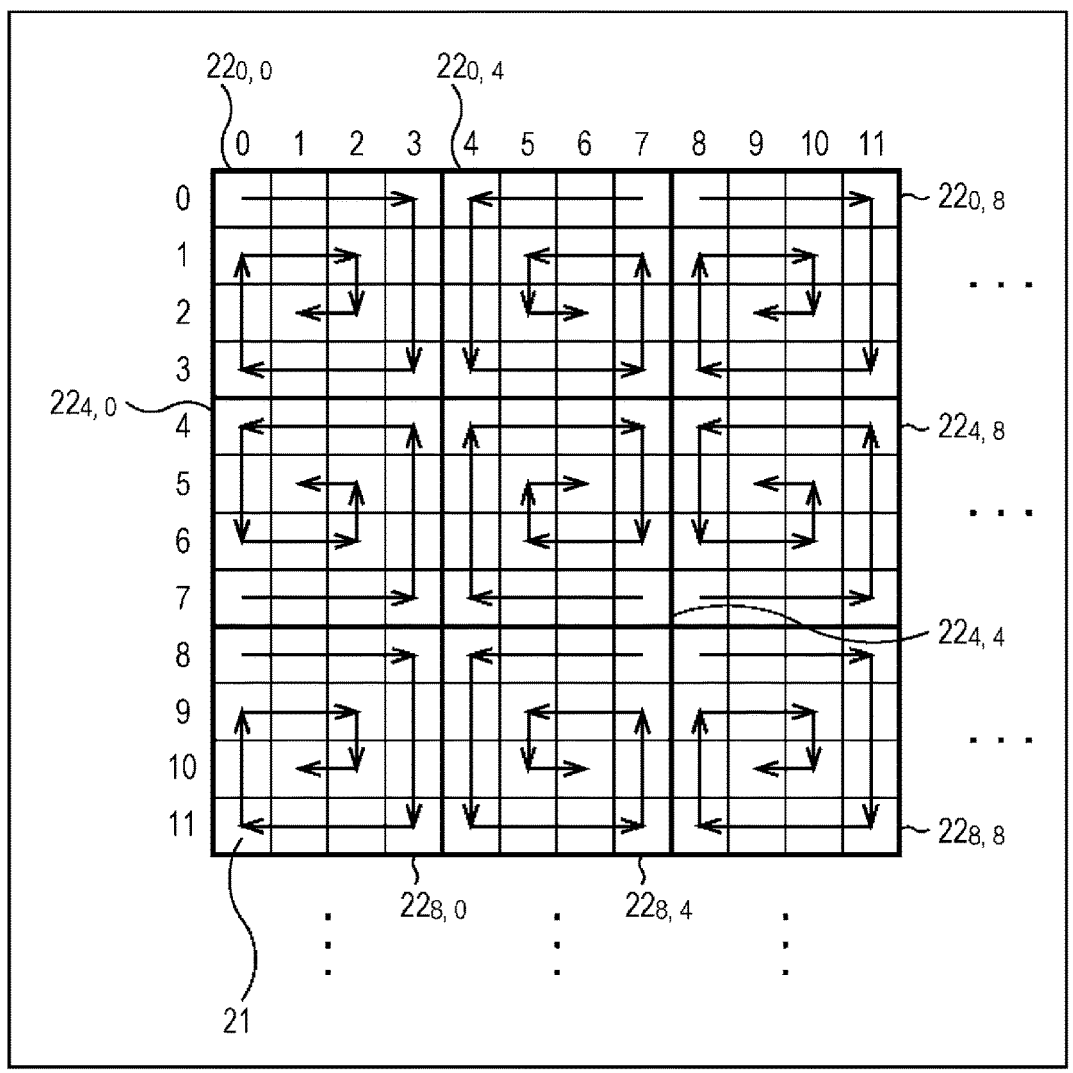
FIG. 6 is a diagram which illustrates scanning order of pixels in pixel blocks according to the present disclosure.

FIG. 6 illustrates another example of scanning order of the plurality of pixels 21 in each pixel block 22 which is provided on the upper substrate 11 of the solid-state imaging device 10. In the figure, as well, a rectangle of a thin line denotes a pixel 21, a thick line denotes a pixel block 22 which is correlated with one ADC 31, numbers denote positions of pixels, and arrows denote scanning order of pixels.

In a case of the figure, scanning order of 16 pixels which belong to a pixel block 22 is moved in the horizontal direction by setting any one of the four vertices of the pixel block 22 as the starting point, and is spirally moved up to a center of the pixel block 22 thereafter.

Even in a case of the figure, when there are four patterns of scanning order of the 16 pixels which belong to a pixel block 22, and paying attention to a pixel block $22_{X, Y}$, pixel blocks 22 of which scanning order is common to that of the pixel block $22_{X, Y}$ are a pixel block $22_{X, Y+8}$ which is separated by one pixel block in the right direction, a pixel block $22_{X, Y-8}$ which is separated by one pixel block in the left direction, a pixel block $22_{X-8, Y}$ which is separated by one pixel block in the upper direction, and a pixel block $22_{X+8, Y}$ which is separated by one pixel block in the lower direction.

When the starting point of the scanning order of the pixel block $22_{X, Y}$ is the upper left among the four vertices, the starting points of the scanning order of a pixel block $22_{X, Y+4}$, and a pixel block $22_{X, Y-4}$ which are close to the pixel block $22_{X, Y}$ on the left and right become the upper right among the four vertices.

In addition, starting points of the scanning order of a pixel block $22_{X-4, Y}$, and a pixel block $22_{X+4, Y}$ which are vertically close to the pixel block $22_{X, Y}$ become the lower left among the four vertices.

In addition, the starting point of the scanning order of the pixel block $22_{X-4, Y-4}$, the pixel block $22_{X-4, Y+4}$, the pixel block $22_{X+4, Y-4}$, and the pixel block $22_{X+4, Y+4}$, which are located diagonally to the pixel block $22_{X, Y}$ becomes the lower right among the four vertices.

In the case of FIG. 6, as well, similarly to the case in FIG. 5, scanning timings of pixels which are located on the boundary between neighboring pixel blocks 22 typically match with each other. Accordingly, it is possible to prevent blurring in an image from occurring on a boundary between pixel blocks 22, and to suppress a change in topology of an object in an image.

In addition, scanning order of the plurality of pixels 21 in each pixel block 22 which is provided on the upper substrate 11 of the solid-state imaging device 10 is not limited to the example which is illustrated in FIG. 5 or 6, and scanning order of pixels on a boundary between neighboring pixel blocks may be set so as to match typically.

Application Example of Solid-State Imaging Device 10

Figure 7:
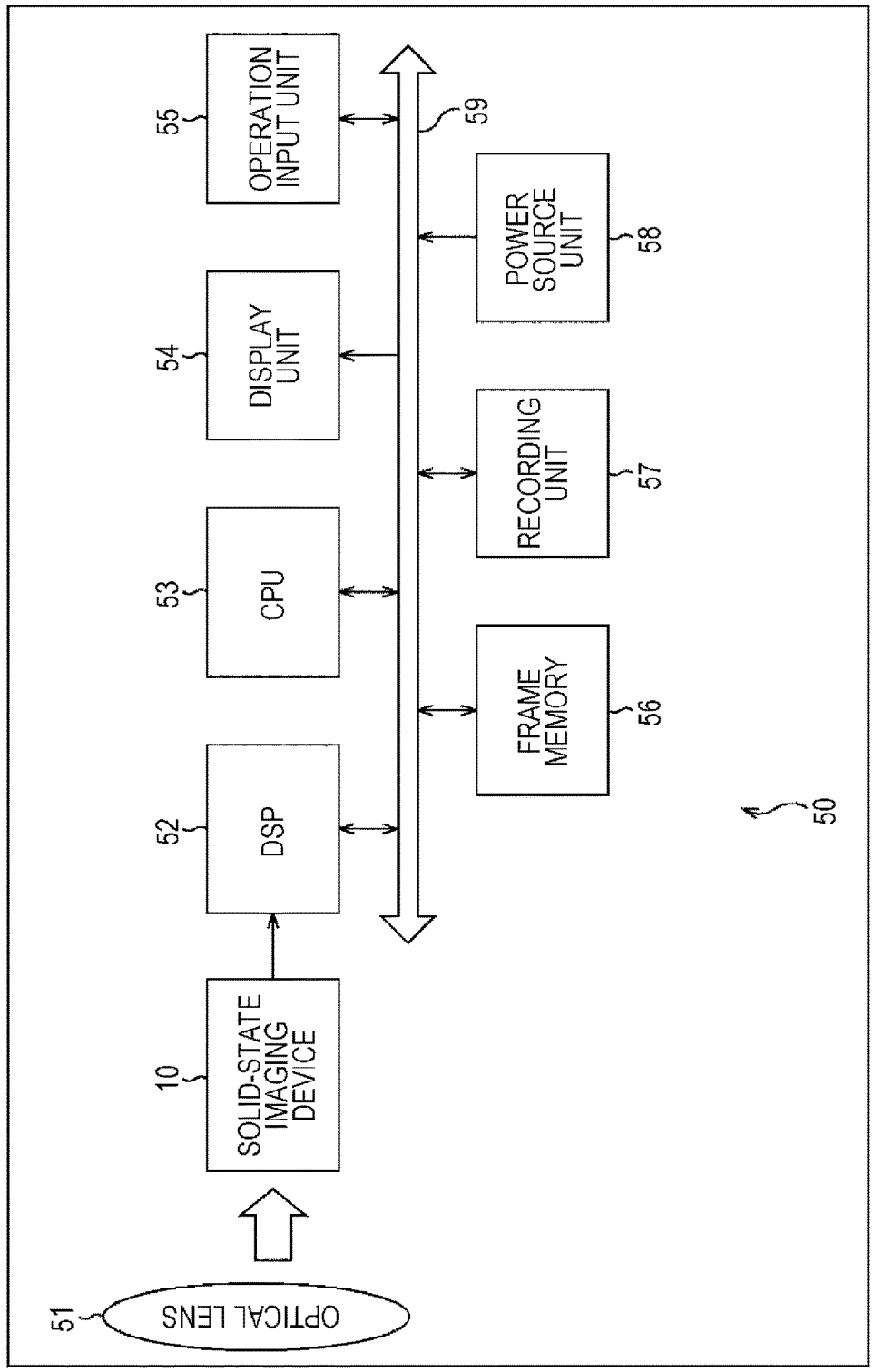
FIG. 7 is a block diagram which illustrates a configuration example of an imaging apparatus according to the present disclosure.

FIG. 7 illustrates a configuration example of an imaging apparatus 50 on which the solid-state imaging device 10 is mounted. In the imaging apparatus 50, the solid-state imaging device 10 performs photoelectric conversion processing according to input light which is condensed by an optical lens 51, and outputs a digital image signal based on a charge which is generated as a result thereof to a DSP 52. The imaging apparatus 50 can be used for sensing, for example.

In addition, the embodiment of the present disclosure is not limited to the above described embodiments, and can be variously modified without departing from the scope of the present disclosure.

One configuration of the present disclosure is a solid-state imaging device comprising: a plurality of pixel blocks arranged in a matrix, respective ones of the pixel blocks including a plurality of pixels configured to generate a charge corresponding to input light; a control unit including a vertical scanning unit and a horizontal scanning unit; and a plurality of analog-to-digital converters, respective ones of the analog-to-digital converters disposed corresponding to respective ones of the pixel blocks, wherein the control unit is configured to sequentially scan respective ones of the pixels at a timing such that adjacent pixels which are located on a boundary of adjacent pixel blocks are scanned simultaneously.

Another configuration of the present disclosure is the solid-state imaging device according to the preceding configuration, wherein the control unit is configured to sequentially scan respective ones of the pixels such that a scanning sequence of a respective pixel block is reversed in either the row direction or the column direction with respect to a scanning sequence of an adjacent pixel block.

Yet another configuration of the present disclosure is the solid-state imaging device according to any one of the preceding configurations, wherein the control unit is configured to sequentially scan respective ones of the pixels such that a scanning sequence of a respective pixel block is reversed in either the row direction or the column direction with respect to a scanning sequence of all directly adjacent pixel blocks.

Yet another configuration of the present disclosure is the solid-state imaging device according to any one of the preceding configurations, wherein the scanning sequence of the respective pixel block is a pattern wherein scanning is started in a horizontal direction by setting a pixel located at a corner of the respective pixel block as a starting point, a row to be scanned is moved in the vertical direction sequentially, and a pixel located at an opposite corner of the respective pixel block is lastly scanned.

Yet another configuration of the present disclosure is the solid-state imaging device according to any one of the preceding configurations, wherein the scanning sequence of the respective pixel block is a rectilinear spiral pattern beginning with a pixel located at a corner of the respective pixel block.

Yet another configuration of the present disclosure is the solid-state imaging device according to any one of the preceding configurations, further comprising an upper substrate including the plurality of pixel blocks and the control unit; and a lower substrate including the plurality of analog-to-digital converters and a timing generation unit, wherein the upper substrate and the lower substrate are bonded and connected to each other at corresponding portions.

Yet another configuration of the present disclosure is the solid-state imaging device according to any one of the preceding configurations, wherein respective ones of the pixels within a respective pixel block are arranged in a square submatrix.

Yet another configuration of the present disclosure is a method of driving a solid-state imaging device comprising a plurality of pixel blocks arranged in a matrix, respective ones of the pixel blocks including a plurality of pixels configured to generate a charge corresponding to input light; a control unit including a vertical scanning unit and a horizontal scanning unit; and a plurality of analog-to-digital converters, respective ones of the analog-to-digital converters disposed corresponding to respective ones of the pixel blocks, the method comprising the step of: sequentially scanning respective ones of the pixels at a timing such that adjacent pixels which are located on a boundary of adjacent pixel blocks are scanned simultaneously.

Yet another configuration of the present disclosure is the method of driving a solid-state imaging device according to the preceding configuration, further comprising the step of: sequentially scanning respective ones of the pixels such that a scanning sequence of a respective pixel block is reversed in either the row direction or the column direction with respect to a scanning sequence of an adjacent pixel block.

Yet another configuration of the present disclosure is the method of driving a solid-state imaging device according to any one of the preceding configurations, further comprising the step of: sequentially scanning respective ones of the pixels such that a scanning sequence of a respective pixel block is reversed in either the row direction or the column direction with respect to a scanning sequence of all directly adjacent pixel blocks.

Yet another configuration of the present disclosure is the method of driving a solid-state imaging device according to any one of the preceding configurations, wherein the scanning sequence of the respective pixel block is a pattern wherein scanning is started in a horizontal direction by setting a pixel located at a corner of the respective pixel block as a starting point, a row to be scanned is moved in the vertical direction sequentially, and a pixel located at an opposite corner of the respective pixel block is lastly scanned.

Yet another configuration of the present disclosure is the method of driving a solid-state imaging device according to any one of the preceding configurations, wherein the scanning sequence of the respective pixel block is a rectilinear spiral pattern beginning with a pixel located at a corner of the respective pixel block.

Yet another configuration of the present disclosure is the method of driving a solid-state imaging device according to any one of the preceding configurations, further comprising an upper substrate including the plurality of pixel blocks and the control unit; and a lower substrate including the plurality of analog-to-digital converters and a timing generation unit, wherein the upper substrate and the lower substrate are bonded and connected to each other at corresponding portions.

Yet another configuration of the present disclosure is the method of driving a solid-state imaging device according to any one of the preceding configurations, wherein respective ones of the pixels within a respective pixel block are arranged in a square submatrix.

Yet another configuration of the present disclosure is an imaging apparatus comprising: the solid-state imaging device according to any one of the preceding configurations; an optical lens configured to condense light onto the solid-state imaging device; a digital signal processor configured to process an output signal of the solid-state imaging device.

REFERENCE SIGNS LIST

10 SOLID-STATE IMAGING DEVICE
11 UPPER SUBSTRATE
12 LOWER SUBSTRATE
21 PIXEL
22 PIXEL BLOCK
31 ADC
50 IMAGING APPARATUS

The invention claimed is:
1. A solid-state imaging device comprising:
a plurality of pixel blocks arranged in a matrix, respective ones of the pixel blocks including a plurality of pixels configured to generate a charge corresponding to input light;
a control unit including a vertical scanning unit and a horizontal scanning unit, wherein the control unit is configured to sequentially scan respective ones of the pixels of the pixel blocks such that a scanning sequence of a respective pixel block is reversed in either the row direction or the column direction with respect to a scanning sequence of all directly adjacent pixel blocks; and a plurality of analog-to-digital converters, respective ones of the analog-to-digital converters disposed corresponding to respective ones of the pixel blocks, wherein the control unit is configured to sequentially scan respective ones of the pixels of the pixel blocks at a timing such that adjacent pixels of the pixel blocks which are located on a boundary of adjacent pixel blocks are scanned simultaneously, wherein the scanning sequence of the respective pixel block is a pattern wherein scanning is started in a horizontal direction by setting a pixel located at a corner of the respective pixel block as a starting point, a row to be scanned is moved in the vertical direction sequentially, and a pixel located at an opposite corner of the respective pixel block is lastly scanned.

2. An imaging apparatus comprising:
the solid-state imaging device according to claim 1;
an optical lens configured to condense light onto the solid-state imaging device;
a digital signal processor configured to process an output signal of the solid-state imaging device.

3. The solid-state imaging device according to claim 1, further comprising an upper substrate including the plurality of pixel blocks and the control unit; and
a lower substrate including the plurality of analog-to-digital converters and a timing generation unit,
wherein the upper substrate and the lower substrate are bonded and connected to each other at corresponding portions.

4. The solid-state imaging device according to claim 1, wherein respective ones of the pixels within the respective pixel block are arranged in a square submatrix.

5. A solid-state imaging device comprising:
a plurality of pixel blocks arranged in a matrix, respective ones of the pixel blocks including a plurality of pixels configured to generate a charge corresponding to input light;
a control unit including a vertical scanning unit and a horizontal scanning unit, wherein the control unit is configured to sequentially scan respective ones of the pixels of the pixel blocks such that a scanning sequence of a respective pixel block is reversed in either the row direction or the column direction with respect to a scanning sequence of all directly adjacent pixel blocks; and
a plurality of analog-to-digital converters, respective ones of the analog-to-digital converters disposed corresponding to respective ones of the pixel blocks, wherein the control unit is configured to sequentially scan respective ones of the pixels of the pixel blocks at a timing such that adjacent pixels of the pixel blocks which are located on a boundary of adjacent pixel blocks are scanned simultaneously, wherein the scanning sequence of the respective pixel block is a rectilinear spiral pattern beginning with a pixel located at a corner of the respective pixel block.

6. The solid-state imaging device according to claim 5, further comprising an upper substrate including the plurality of pixel blocks and the control unit; and
a lower substrate including the plurality of analog-to-digital converters and a timing generation unit,
wherein the upper substrate and the lower substrate are bonded and connected to each other at corresponding portions.

7. The solid-state imaging device according to claim 5, wherein respective ones of the pixels within the respective pixel block are arranged in a square submatrix.

8. An imaging apparatus comprising:
the solid-state imaging device according to claim 5;
an optical lens configured to condense light onto the solid-state imaging device;
a digital signal processor configured to process an output signal of the solid-state imaging device.

9. A method of driving a solid-state imaging device comprising a plurality of pixel blocks arranged in a matrix, respective ones of the pixel blocks including a plurality of pixels configured to generate a charge corresponding to input light; a control unit including a vertical scanning unit and a horizontal scanning unit; and a plurality of analog-to-digital converters, respective ones of the analog-to-digital converters disposed corresponding to respective ones of the pixel blocks, the method comprising the steps of:
sequentially scanning respective ones of the pixels of the pixel blocks at a timing such that adjacent pixels of the pixel blocks which are located on a boundary of adjacent pixel blocks are scanned simultaneously; and
sequentially scanning respective ones of the pixels of the pixel blocks such that a scanning sequence of a respective pixel block is reversed in either the row direction or the column direction with respect to a scanning sequence of all directly adjacent pixel blocks, wherein the scanning sequence of the respective pixel block is a pattern wherein scanning is started in a horizontal direction by setting a pixel located at a corner of the respective pixel block as a starting point, a row to be scanned is moved in the vertical direction sequentially, and a pixel located at an opposite corner of the respective pixel block is lastly scanned.

10. The method of driving a solid-state imaging device according to claim 9, further comprising an upper substrate including the plurality of pixel blocks and the control unit; and a lower substrate including the plurality of analog-to-digital converters and a timing generation unit, wherein the upper substrate and the lower substrate are bonded and connected to each other at corresponding portions.

11. The method of driving a solid-state imaging device according to claim 9, wherein respective ones of the pixels within the respective pixel block are arranged in a square submatrix.

12. A method of driving a solid-state imaging device comprising a plurality of pixel blocks arranged in a matrix, respective ones of the pixel blocks including a plurality of pixels configured to generate a charge corresponding to input light; a control unit including a vertical scanning unit and a horizontal scanning unit; and a plurality of analog-to-digital converters, respective ones of the analog-to-digital converters disposed corresponding to respective ones of the pixel blocks, the method comprising the steps of:
sequentially scanning respective ones of the pixels of the pixel blocks at a timing such that adjacent pixels of the pixel blocks which are located on a boundary of adjacent pixel blocks are scanned simultaneously; and
sequentially scanning respective ones of the pixels of the pixel blocks such that a scanning sequence of a respective pixel block is reversed in either the row direction or the column direction with respect to a scanning sequence of all directly adjacent pixel blocks, wherein the scanning sequence of the respective pixel block is a rectilinear spiral pattern beginning with a pixel located at a corner of the respective pixel block.

13. The method of driving a solid-state imaging device according to claim 12, further comprising an upper substrate including the plurality of pixel blocks and the control unit; and a lower substrate including the plurality of analog-to-digital converters and a timing generation unit, wherein the upper substrate and the lower substrate are bonded and connected to each other at corresponding portions.

14. The method of driving a solid-state imaging device according to claim 12, wherein respective ones of the pixels within the respective pixel block are arranged in a square submatrix.

\* \* \* \* \*